(12) United States Patent
Sato

(10) Patent No.: US 9,084,396 B2
(45) Date of Patent: Jul. 21, 2015

(54) HANDHELD POWER WORKING MACHINE

(75) Inventor: Tomoaki Sato, Numazu (JP)

(73) Assignee: MAKITA CORPORATION, Anjo-shi (JP)

(*) Notice: Subject to any disclaimer, the term of this patent is extended or adjusted under 35 U.S.C. 154(b) by 865 days.

(21) Appl. No.: 13/198,317

(22) Filed: Aug. 4, 2011

(65) Prior Publication Data

US 2012/0048584 A1    Mar. 1, 2012

(30) Foreign Application Priority Data

Aug. 24, 2010 (JP) .................... 2010-187594

(51) Int. Cl.
| | | |
|---|---|---|
| B23B 45/00 | (2006.01) | |
| A01G 3/053 | (2006.01) | |
| B25F 5/02 | (2006.01) | |
| B27B 17/00 | (2006.01) | |

(52) U.S. Cl.
CPC . *A01G 3/053* (2013.01); *B25F 5/02* (2013.01); *B27B 17/0008* (2013.01)

(58) Field of Classification Search
CPC ............ B25F 5/02; B25F 5/026; B25F 5/021; B25F 5/00; B23D 49/162; B25D 17/04; B25D 2250/121; B27B 9/02; B27B 17/0008; A01G 3/037; A01G 3/085; A01G 3/08; A01G 3/053
USPC ............... 173/170, 1, 217, 39, 216, 40, 42; 30/210, 165, 216, 312, 392, 340–344, 30/369, 376, 514, 519; 123/334, 402; 56/236

See application file for complete search history.

(56) References Cited

U.S. PATENT DOCUMENTS

| | | | |
|---|---|---|---|
| 5,065,476 A | 11/1991 | Dohse et al. | |
| 5,778,649 A | 7/1998 | Losdahl et al. | |
| 6,108,867 A * | 8/2000 | Nagashima | ................... 16/110.1 |
| 7,287,331 B2 * | 10/2007 | Sasaki et al. | ..................... 30/519 |
| 7,549,196 B2 | 6/2009 | Ziegs et al. | |

(Continued)

FOREIGN PATENT DOCUMENTS

| | | |
|---|---|---|
| DE | 9018178 U1 | 5/1998 |
| EP | 1579757 A1 | 9/2005 |

(Continued)

OTHER PUBLICATIONS

Oct. 24, 2012 Extended European Search Report issued in European Patent Application No. 11177012.9.

(Continued)

*Primary Examiner* — Stephen F Gerrity
*Assistant Examiner* — Joy N Sanders
(74) *Attorney, Agent, or Firm* — Oliff PLC

(57) ABSTRACT

A handheld power working machine includes a main body including a driving part, a working part provided in the main body and configured to drive by the driving part, and a gripper provided to be able to rotate with respect to the main body. The gripper includes a restriction part configured to be able to switch between at least a restriction state where the gripper is restricted from rotating with respect to the main body and a release state where the gripper can rotate by releasing the restriction state, and switching operation parts configured to perform switching operation to switch between the restriction state and the release state in the restriction part. Respective switching operation parts are disposed in at least one side and the other side of the gripper in a rotating direction.

8 Claims, 6 Drawing Sheets

(56) References Cited

U.S. PATENT DOCUMENTS

| | | |
|---|---|---|
| 7,866,048 B2 | 1/2011 | Kodama et al. |
| 2005/0115340 A1 | 6/2005 | Sasaki et al. |
| 2005/0204568 A1 | 9/2005 | Sasaki |
| 2005/0257943 A1* | 11/2005 | Nystrom et al. ............ 173/170 |
| 2009/0064504 A1 | 3/2009 | Kodama et al. |
| 2010/0199949 A1 | 8/2010 | Tamura et al. |

FOREIGN PATENT DOCUMENTS

| | | |
|---|---|---|
| EP | 2196084 A2 | 6/2010 |
| JP | A-03-117573 | 5/1991 |
| JP | U-04-033505 | 3/1992 |
| JP | A-8-229853 | 9/1996 |
| JP | A-09-103195 | 4/1997 |
| JP | A-2005-176822 | 7/2005 |
| JP | A-2005-261393 | 9/2005 |
| JP | A-2006-116624 | 5/2006 |
| JP | A-2008-543275 | 12/2008 |
| JP | A-2009-273434 | 11/2009 |
| JP | A-2009-284802 | 12/2009 |

OTHER PUBLICATIONS

Mar. 25, 2014 Office Action issued in Japanese Patent Application No. 2010-187594 (with translation).

* cited by examiner

HANDHELD POWER WORKING MACHINE

BACKGROUND

1. Field of the Invention

The present invention relates to a handheld power working machine having a gripper held by a user working, and more specifically, to a handheld power working machine having a gripper rotating with respect to a main body.

2. Description of the Related Art

Conventionally, a handheld power working machine has been known where a working part such as a blade driven by a driving part such as an engine is provided in front of a main body, and the driving part is incorporated in the main body. This handheld power working machine may include a main handle and a sub-handle where the main handle is held by a user to operate the working part and the sub-handle is used as an aid to the main handle to support the main body. The main handle may rotate with respect to the main body.

For example, a power working machine is disclosed, for example, in Japanese Patent Application Laid-Open Publication No. 2005-176822 (claim 1 and FIG. 4), where a handle is pivotably mounted on a shaft part extending from a main body. The handle has a locking mechanism that restricts rotation, a locking release lever that releases this locking mechanism and a stopper member that allows the locking mechanism to operate when restricting the throttle lever from swinging, and restricts the locking mechanism from operating when allowing the throttle lever to swing. The stopper member is provided in a position apart from the throttle lever.

This power working machine having the locking mechanism seems to be able to prevent incorrect operation because of reliably prohibiting the throttle lever from operating during rotating operation of the handle and also prohibiting the handle from rotating during operation of the throttle lever.

However, the power working machine disclosed in the above-described patent document does not necessarily have good operationality. It is because the locking release lever that operates the locking mechanism is provided in only one position in the lower end side of the handle, and therefore the user needs to lose hold of the handle once and then operate the release lever when, for example, the user stops working and rotates the handle.

SUMMARY

In view of the above-described problem, it is an advantage of an aspect of the present invention to provide a handheld power working machine that makes it possible to operate a gripper to rotate while the user keeps the hand holding the gripper.

According to a first aspect of the present invention, a handheld power working machine includes: a main body provided with a driving part; a working part configured to drive by the driving part; and a gripper provided to be able to rotate with respect to the main body. The gripper includes a restriction part configured to be able to switch between at least a restriction state where the gripper is restricted from rotating with respect to the main body and a release state where the gripper can rotate by releasing the restriction state; and switching operation parts configured to perform switching operation to switch between the restriction state and the release state in the restriction part. Respective switching operation parts are disposed in at least one side and the other side of the gripper in the direction in which the gripper rotates.

Respective switching operation parts are disposed in one side and the other side of the gripper in the direction in which the gripper rotates, and therefore either of the switching operation parts can be operated even if the gripper is restricted from rotating in various positions. As a result of this, it is possible to operate the gripper to rotate while the user keeps the hand holding the gripper. In addition, when holding the gripper with either the right hand or the left hand, the user can operate the switching operation parts while keeping the hand holding the gripper.

The switching operation parts are biased by a biasing member. Respective switching operation parts disposed in one side and the other side of the gripper in the direction in which the gripper rotates, are substantially the same distance apart from the biasing member.

When either of the switching operation parts in one side or the other side in the direction in which the gripper rotates, is pressed, it is possible to perform switching operation with the same force. Therefore, when holding the gripper with either the right hand or the left hand, the user can operate the gripper in the same way without feeling a difference. Consequently, the operationality of the power working machine can be improved. By this means, when holding the gripper with either the right hand or the left hand, the user does not need to release the gripper and can operate the switching operation parts in the same way without feeling a difference.

Each switching operation part includes a force point portion pressed by a hand holding the gripper and is provided to be able to slide on the gripper. The direction in which the switching operation part slides and the direction in which force acts on the force point portion are parallel to one another.

The force point portion provided in a switching operation part is configured such that force is easily applied in the same direction as the direction in which the switching operation part slides, and therefore, the force applied to the force point portion is effectively used to slide the switching operation part. By this means, it is possible to slide the switching operation part with smaller force.

The gripper is formed by a casing which is fabricated by combining a pair of case components having opening parts opposite to one another. A plurality of parts are accommodated in the casing. One case component is combined into the other case component after the plurality of parts are accommodated in the one case component.

When a casing is fabricated by combining a pair of case components after parts are mounted in both case components, complicated work is required because the case components in which parts are mounted are different for parts. However, the parts to be accommodated in the casing are mounted in one case component in advance, and therefore it is possible to efficiently perform assembly operation.

The gripper includes a throttle lever to operate output of the driving part. The switching operation parts are disposed in positions in the gripper where the switching operation parts and also the throttle lever can be operated while the gripper is held.

For example, it is possible to perform the following sequential operation while the user keeps the hand holding the gripper: operating the throttle lever to do work; stopping the work once and operating the switching operation parts to rotate the gripper; and operating the throttle lever again to do work.

According to the present invention, it is possible to provide a handheld power working machine that makes it possible to operate a gripper to rotate while the user keeps the hand holding the gripper.

DETAILED DESCRIPTION

Figure 1:
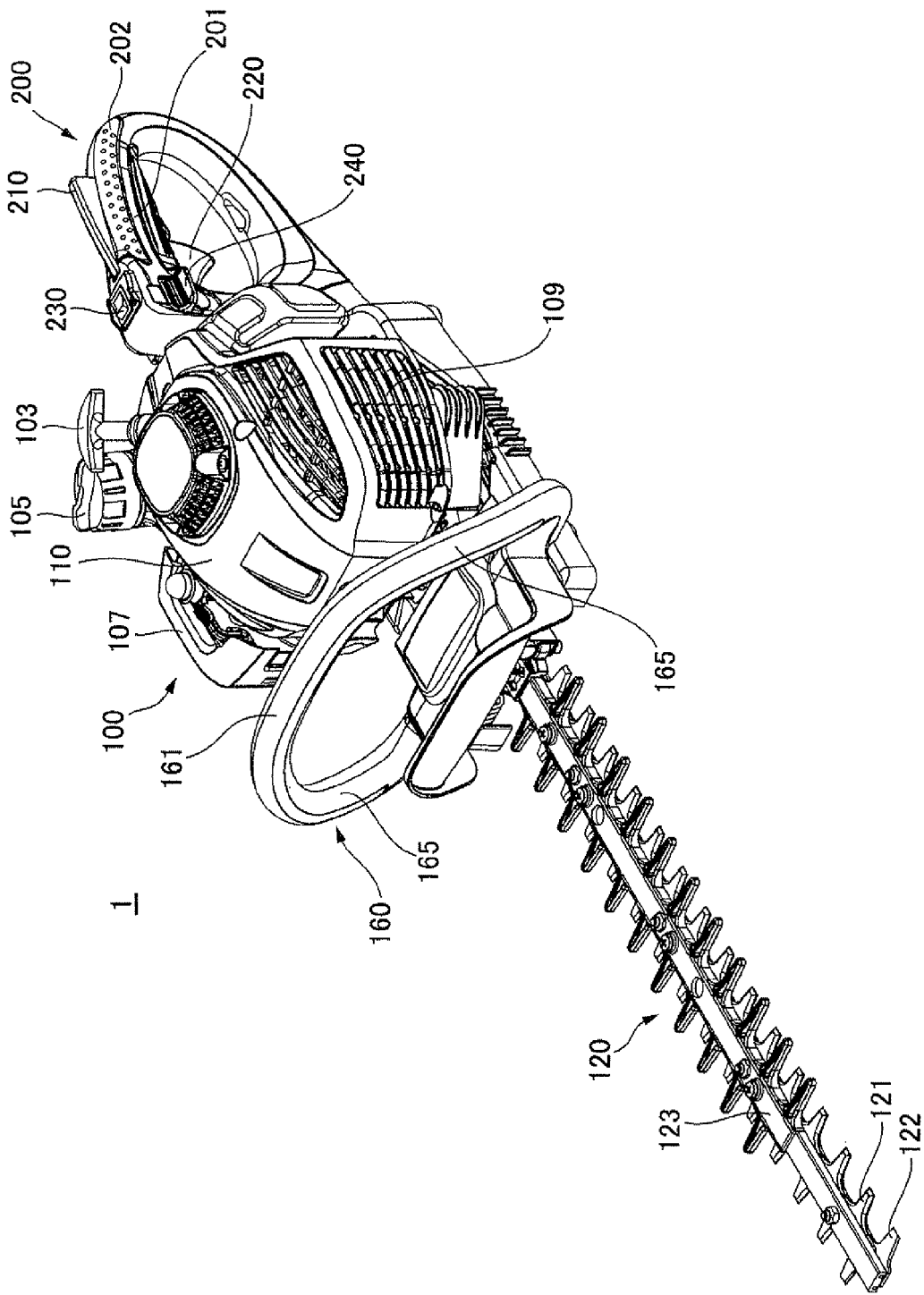
FIG. 1 is an exemplary perspective view showing a hedge trimmer according to an embodiment of the present invention.

Now, an embodiment of the present invention will be described in detail with reference to the drawings. Parts providing the same operational advantage are assigned the same reference numerals, and overlapping descriptions will be omitted for ease of explanation. Although the present invention can be broadly applied to handheld power working machines having a mechanism that allows a gripper to rotate with respect to a main body, an example will be explained here where the present invention is applied to a hedge trimmer.

FIG. 1 is an exemplary perspective view showing a hedge trimmer as a handheld power working machine according to an embodiment of the present invention. As shown in FIG. 1, a hedge trimmer 1 has: a main body 100 including a housing 110 in which a driving part and so forth are accommodated; a working part 120 extending forward from the main body 100 side (opposite a user); a main handle 200 equivalent to a first gripper provided behind the main body 100; and a sub-handle 160 equivalent to a second gripper provided in front of the main body 100.

The main body 100 shown in FIG. 1 has a driving part, which is an engine, and, as seen from outside, the housing 110 exposes a starter handle 103, a fuel tank 105, an air cleaner cover 107, and a muffler cover 109 that covers a muffler. A gear case (not shown) is fixed to the bottom surface of the housing 110. A power transmission mechanism (not shown) that transmits the power of the engine to the working part 120 (blade) is accommodated in the gear case. The power transmission mechanism is a well-known technology, and therefore will not be described in detail. For example, a power transmission mechanism converts rotational motion into reciprocating motion of a blade by providing an eccentric cam on a gear rotated by the power of an engine. Here, although an engine is used as an example of a driving part, a driving part is a broad concept including an engine, an electric motor and so forth, and is used to operate a working part.

The working part 120 formed by, for example, two comb-like blades 121 and 122 overlapping one another. These blades 121 and 122 are connected to the power transmission mechanism in the gear case, and therefore can move forward and backward. The blades 121 and 122 are arranged such that the teeth substantially horizontally project from side to side, and therefore, when the user horizontally holds the main body 100, the working part 120 moves horizontally in working.

The sub-handle 160 is held with the nondominant hand of the user in general, and used to support the hedge trimmer 1, as an assistant to the main handle 200. This sub-handle 160 has an approximately C-shaped (approximately inversed U-shaped) gripper, and includes an upper part as a horizontal grip 161 extending from side to side, and vertical grips 165 extending downward from both ends of the horizontal grip 161. Respective end parts of the vertical grips 165 bend inside and are fixed to the lower part of the front side of the main body 100.

The main handle 200 is held with the dominant hand of the user in general. The main handle 200 has a ring shape as a whole, having an internal circumference which allows the user's palm to be accommodated, and is disposed in the back side (user's side) of the main body 100. In this case, as shown in FIG. 1, the main handle 200 is disposed to be shaped as a ring as seen in side view. Here, the main handle 200 can rotate with respect to the main body 100 about the axis of rotation in the lengthwise direction, and is provided with a restriction part 250 to restrict the main handle 200 from rotating in working. Now, descriptions will be explained in more detail. Here, unless otherwise noted, it is defined that the working part 120 side is the front side and the main handle 200 side is the back side, and the left and right are defined as seen from the back side to the front side for ease of explanation.

Figure 2:
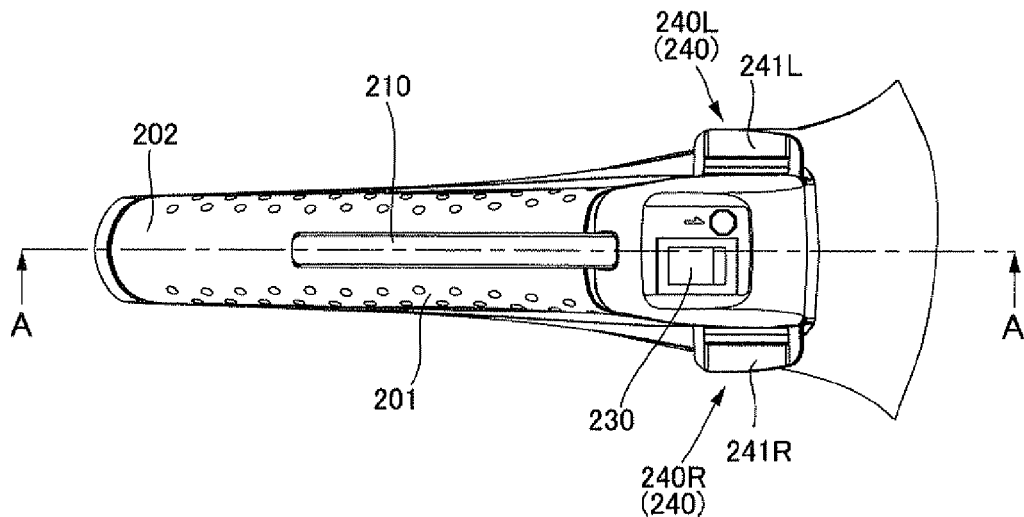
FIG. 2A is an exemplary plan view showing a main handle in the hedge trimmer according to an embodiment of the present invention.
FIG. 2B is an exemplary right side view showing the main handle in the hedge trimmer according to an embodiment of the present invention.
Figure 2:
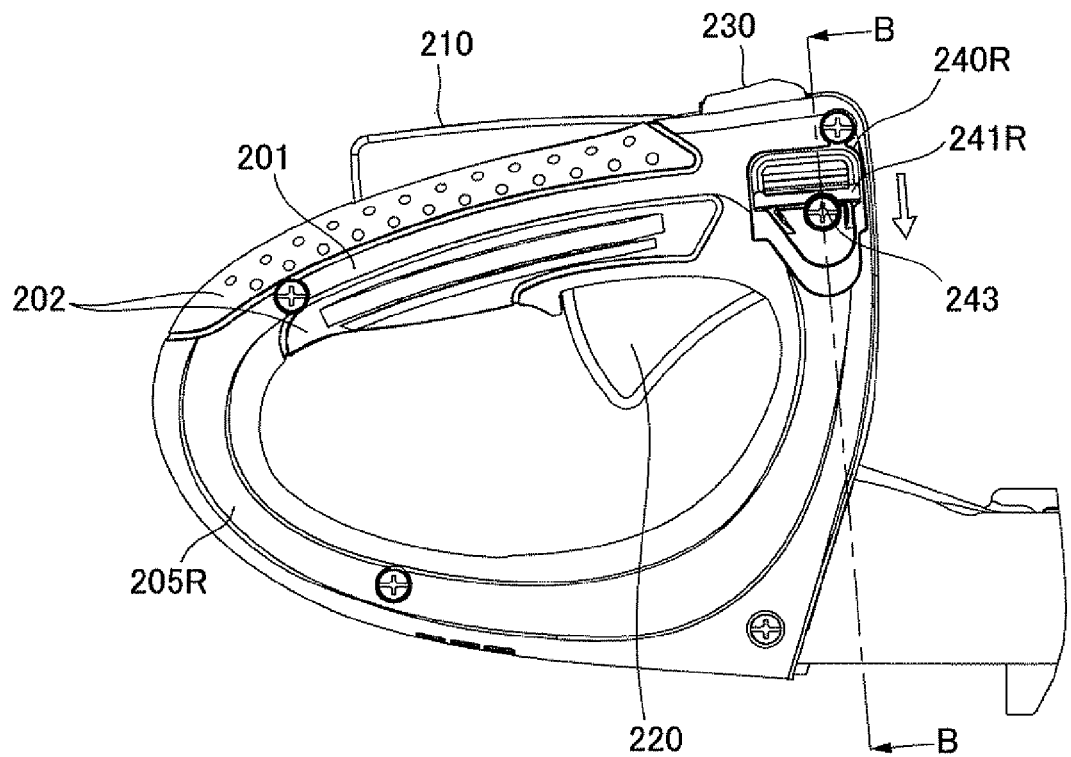

FIG. 2 is an exemplary enlarged view showing the main handle 200, FIG. 2A is an exemplary plan view showing the main handle 200, and FIG. 2B is an exemplary side view showing the main handle 200. The main handle 200 having a ring shape as seen in side view is designed such that the user holds a gripper 201 in the upper part. A rubber 202 serving as antislip and vibration proof is attached to the gripper 201. In the gripper 201, a throttle lever 220 to adjust output of the engine after the engine is activated, is disposed in the lower part (on the inner surface of the main handle 200), a stop switch 230 to stop the engine is disposed in the front side of the upper part, and a lock lever 210 that is a safety device for the throttle lever 220 is disposed behind the stop switch 230. Then, in order to operate the gripper 201 while the user keeps the hand holding the gripper 201 even if the gripper 201 is restricted from rotating in various positions, the gripper 201 is provided with a switching operation part 240 (a male member 240L and a female member 240R) to release the main handle 200 from restriction of rotation, on both left and right sides of the front part of the gripper 201. By this means, for example, when holding the gripper 201 with either the left hand or the right hand, the user can easily operate the switching operation part 240 with the thumb keeping the hand holding the gripper 201.

The main handle 200 is formed by a right case 205R and a left case 205L (collectively referred to as "case 205") including vertical surfaces that open opposite to one another. The right case 205R and the left case 205L are combined by matching the openings with one another to form a cavity in the main handle 200.

Figure 3:
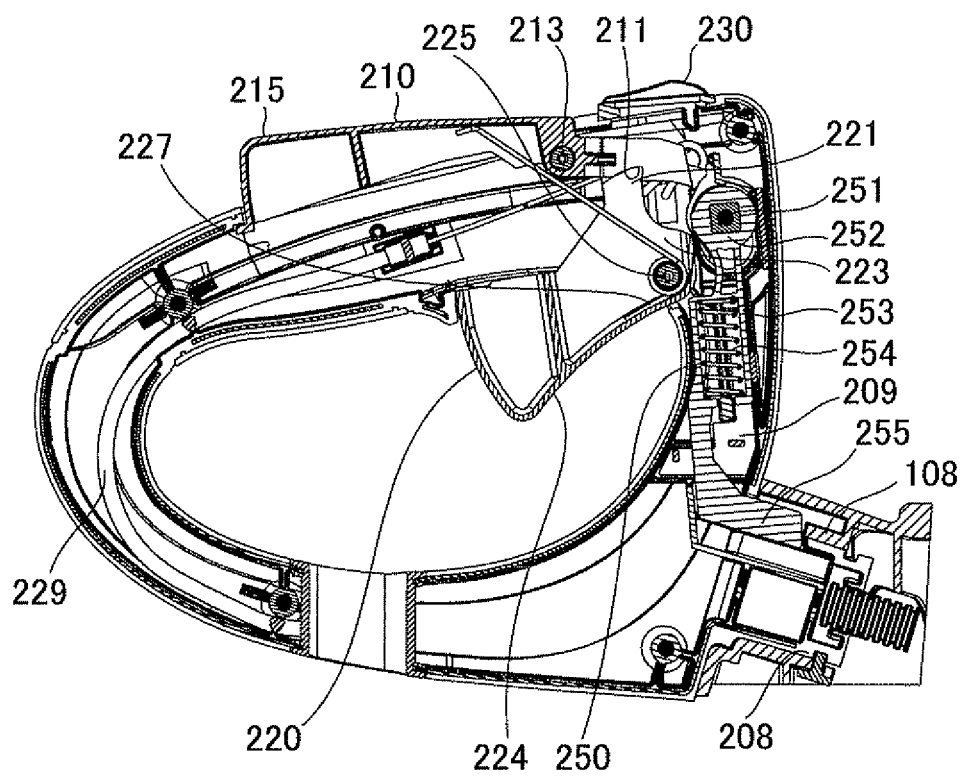
FIG. 3 is an exemplary cross sectional view taken along line A-A in FIG. 2A.

As shown in FIG. 3, the throttle lever 220 includes a first convex restriction part 221 and a second convex restriction part 223 in the upper part and the lower part, respectively, in the front side, and a lever part 224 that the user press with a finger in the back side. This throttle lever 220 is mounted to be able to pivotally move in a predetermined range about a rotating shaft 225 provided in the bottom end part in the front side. The throttle lever 220 can change states among a first state where it projects downward from the main handle 200, a second state where it is accommodated in the main handle 200 and an optional neutral state between the first state and the second state. The throttle lever 220 is connected with the engine through a throttle wire 229, and therefore output of the engine can be controlled according to the state of the throttle lever 220. Here, the throttle wire 229 is connected to the main body 100 passing through the back part of the main handle 200 while being accommodated in the left case 205L.

The lock lever 210 has a concave restriction part 211 matching the first restriction part 221 in the throttle lever 220 in the lower part of the front side, and a pressing part 215 in the back side. This lock lever 210 is mounted to pivotably move in a predetermined range about a rotating shaft 213 provided between the restriction concave part 211 and the pressing part 215 in the lengthwise direction, and can switch between a first state where it projects upward from the main handle 200 and a second state where it is accommodated in the main handle 200. When the lock lever 210 is not pressed but projects upward from the main handle 200, the first restriction part 221 formed in the front part of the throttle lever 220 is fitted into the concave restriction part 211 formed in the front part of the lock lever 210, and therefore the throttle lever 220 is not accommodated in the main handle 200 even if the user attempts to operate the throttle lever 220.

Here, a torsion coil spring 227 as a biasing member is fitted into the rotating shaft 225 in the throttle lever 220. One end of the torsion coil spring 227 contacts the inner bottom surface of the throttle lever 220, and the other end contacts the inner top surface of the lock lever 210. By this means, the throttle lever 220 and the lock lever 210 are biased downward and upward, respectively.

Figure 4:
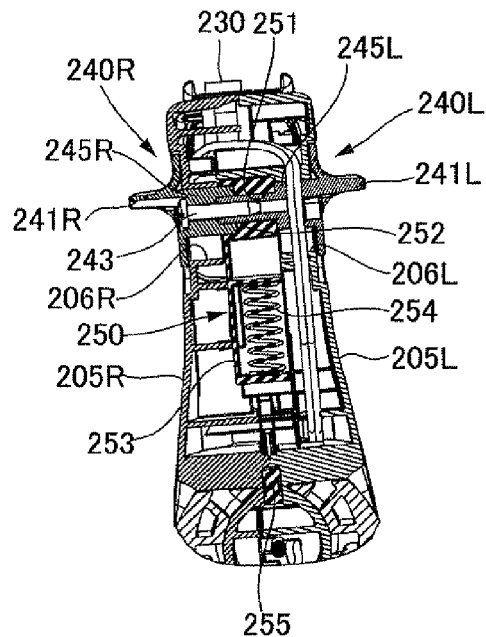
FIG. 4 is an exemplary cross sectional view taken along line B-B in FIG. 2B.

As shown in FIG. 4, the switching operation part 240 includes the male member 240L and the female member 240R. The male member 240L is provided with a pressing portion 241L projecting in the left side of the gripper 201, and the female member 240R is provided with a pressing portion 241R projecting in the right side. The male member 240L and the female member 240R are partly inserted into a locking hole 206R provided in the right case 205R and a locking hole 206L provided in the left case 205L, respectively. Then, a convex part 245L provided in the male member 240L is fitted into the concave part 245R provided in the male member 240L in the case 205, and then fastened with a fastening member 243 such as a screw, so that the male member 240L and the female member 240R are provided to sandwich the case 205. Here, the length of the locking holes 206L and 206R in the vertical direction is greater than the length of the convex part 245L and the concave part 245R fitting into one another in the vertical direction, so that the switching operation part 240 can slide on the case 205 in the range for the difference between the length of the locking holes 206R and 206L in the vertical direction and the outer diameter of the concave part 245R and the convex part 245L fitting into one another. Here, the pressing portions 241L and 241R serve as force point portions to which the user applies force during operation of the switching operation part 240, and are formed as plates parallel to the direction orthogonal to the sliding direction of the switching operation part 240. Therefore, the direction of the action of the force (pressing direction) applied to the pressing portions 241L and 241R is parallel to the sliding direction of the switching operation part 240. This allows the applied force to act in one direction (the sliding direction indicated by a white arrow in FIG. 2A), and therefore it is possible to slide the switching operation part 240 with smaller force. In addition, the pressing portions 241L and 241R incline to slightly elevate the front side according to the inclination of the gripper 201 inclining to elevate the front side. By this means, the inclination of the gripper 201 approximately matches that of the pressing portions 241L and 241R, and therefore the user easily operates the pressing portions 241L and 241R while holding the gripper 201.

These convex part 245L and concave part 245R in the switching operation part 240 are fitted into a fitting hole 251 provided in the top of the restriction part 250. This restriction part 250 freely moves in the sliding direction of the switching operation part 240 in conjunction with the switching operation. The restriction part 250 includes the fitting hole 251 in the top part, an intermediate part 253 extending in the sliding direction of the switching operation part 240, and a locking portion 255 bending at the end of the intermediate part 253 and projecting from the main handle 200 toward the main body 100. The fitting hole 251 is provided in the center of a cylindrical body 252 having an approximately circular shape as seen in side view. This cylindrical body 252 does not contact the second restriction part 223 when the throttle lever 220 is not pressed (see FIG. 6), and, on the other hand, when the throttle lever 220 is pressed, the second restriction part 223 moves below the cylindrical body 252. Therefore, when moving downward, the cylindrical body 252 contacts the second restriction part 223 (see FIG. 5). By this means, the cylindrical body 252 (restriction part 250) is restricted from moving downward.

Then, the intermediate part 253 is a tubular body in which a coil spring 254 is accommodated. The coil spring 254 is a biasing member that biases the switching operation part 240 to slide upward. This tubular body is disposed at the midpoint between the left case 205L and the right case 205R, and therefore, the pressing portion 241L in the male member 240L supported by the left case 205L and the pressing portion 241R in the female member 240R supported by the right case 205R are the same distance apart from the tubular body. As a result of this, when either the pressing portion 241L or 241R is pressed, it is possible to perform switching operation with the same force. By this means, when holding the gripper 201 with either the right hand or the left hand, the user does not need to release the gripper 201, and can operate the switching operation part 240 in the same way without feeling a difference.

The main handle 200 has a convex part 208 having an approximately cylindrical shape, which projects forward, in the bottom of the front side. Meanwhile, the housing 110 in the main body 100 has a concave part 108 matching the convex part 208 in the bottom of the back side. Then, convex part 208 is fitted into the concave part 108 with a little clearance, so that the main handle 200 is supported to be able to rotate with respect to the housing 110.

Figure 7:
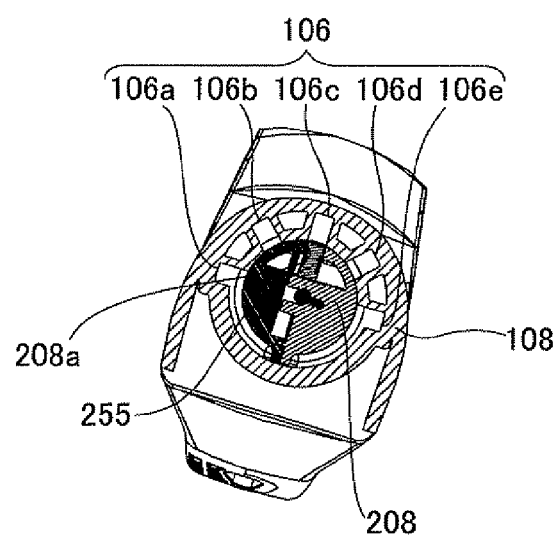
FIG. 7 is an exemplary cross sectional view taken along C-C line in FIG. 6.

Here, as shown in FIG. 7, a notch 208a is formed on the top of the convex part 208 to allow the locking portion 255 in the restriction part 250 to freely enter and exit. In addition, the restriction grooves 106 extending in the lengthwise direction are formed on the internal perimeter surface of the concave part 108 every predetermined angle, and allow the locking portion 255 to fit into them. As shown in FIG. 7, five restriction grooves 106a, 106b, 106c, 106d and 106e are formed in the upper half of the concave part 108 every forty-five degrees.

Figure 6:
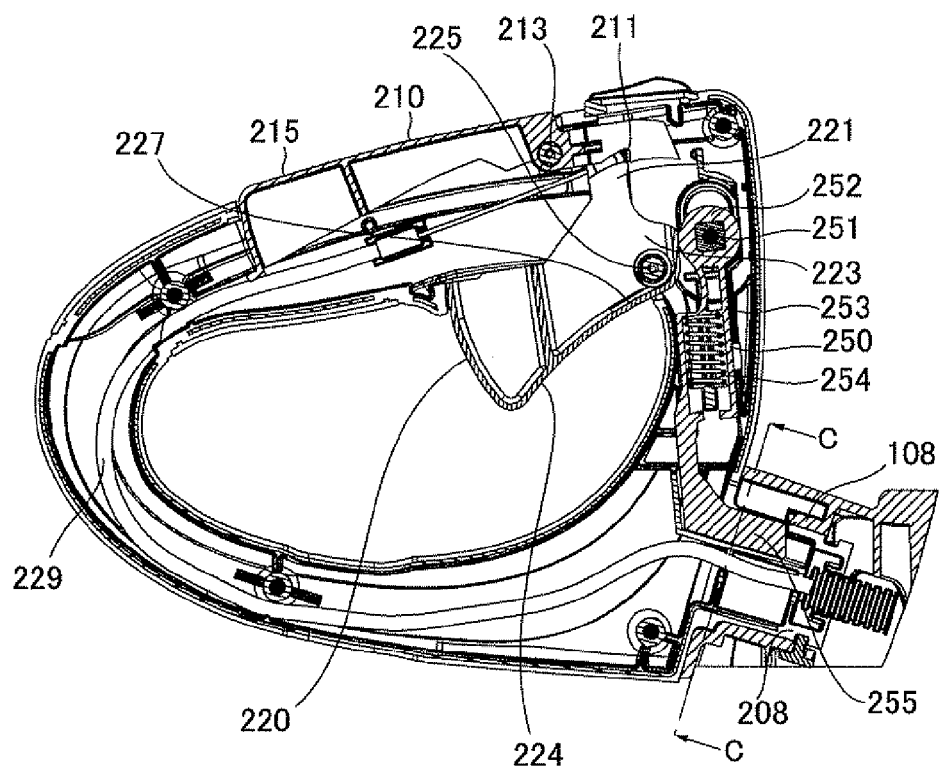
FIG. 6 is an exemplary cross sectional view showing the main handle in a release state.

In a state in which the pressing portion 241 in the switching operation part 240 is not pressed, the switching operation part 240 is biased upward by the biasing force of the coil spring 254 as shown in FIG. 3. In this case, the restriction part 250 moves in conjunction with the switching operation part 240, and is located in the direction in which the switching operation part 240 slides upward. At this time, the locking portion 255 is fitted into a restriction groove 106 to place the main handle 200 into a restriction state in which the main handle 200 cannot rotate with respect to the main body 100. On the other hand, when the switching operation part 240 is pressed down against the biasing force of the coil spring 254, the restriction part 250 moves down as shown in FIG. 6, in conjunction with the movement of the switching operation part 240. At this time, the locking portion 255 is located below the restriction grooves 106 and released from the locked state, and therefore placed into a release state in which the main handle 200 can rotate with respect to the main body 100. In the release state, pressing by the pressing portion 241 is stopped after the main handle 200 is rotated with respect to the main body 100 to the position of a desired restriction groove among the restriction grooves 106a to 106e, and therefore, the restriction part 250 moves upward and the locking portion 255 is fitted into any restriction groove 106. This places the main handle 200 into the restriction state again to fix the main handle 200 to the main body 100.

This switching operation between the restriction state and the release state by the switching operation part 240 can be performed in a state in which the throttle lever 220 is not operated, that is, the lever part 224 projects from the case 205 (not in working condition). It is because the cylindrical body 252 in the restriction part 250 does not contact the second restriction part 223 in the throttle lever 220 and therefore the restriction part 250 can move upward and downward.

Figure 5:
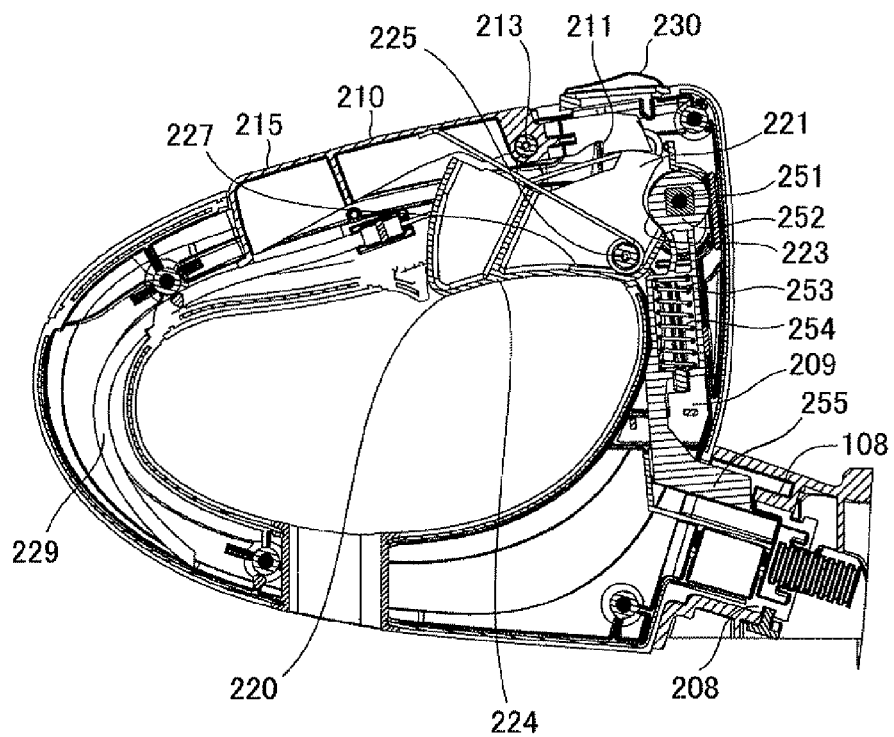
FIG. 5 is an exemplary cross sectional view showing a main handle in working.

On the other hand, as shown in FIG. 5, in a state in which the throttle lever 220 is operated, that is, the lever part 224 is accommodated in the case 205 (in working condition), the lower part of the cylindrical body 252 in the restriction part 250 contacts the second restriction part 223 in the throttle lever 220. As a result of this, the restriction part 250 is restricted from moving downward, and therefore the switching operation part 240 cannot perform switching operation. As described above, in the state in which the working part 120 operates (in working condition), the switching operation part 240 cannot perform switching operation, and therefore the main handle 200 is restricted from rotating with respect to the main body 100. On the other hand, when the working part 120 does not operate (not in working condition), the switching operation part 240 can perform switching operation to allow the main handle 200 to rotate with respect to the main body 100.

Figure 8:
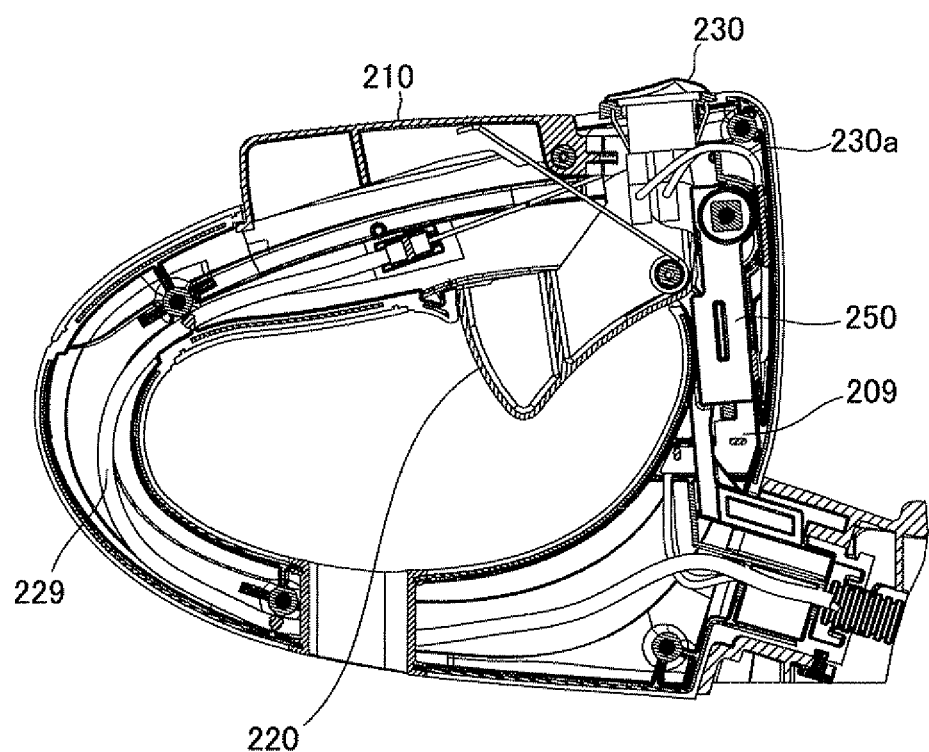
FIG. 8 is an exemplary right side view (partial cross sectional view) showing a state in which a right case is removed from the main handle.

Here, as shown in FIG. 8, when the right case 205R and the left case 205L are combined to form the main handle 200, each part such as the lock lever 210, the throttle lever 220, the throttle wire 229, the stop switch 230 and the restriction part 250 are accommodated or mounted in the left case 205L, and then the right case 205R is fitted to the left case 205L. Here, the cord 230a for the stop switch 230 extends near the restriction part 250 and is connected to the main body 100. In this case, a blocking plate 209 is provided between the restriction part 250 and the cord 230a so as not to interfere with the operation of the restriction part 250. Here, the switching operation part 240 (the male member 240L and the female member 240R) is not mounted in the left case 205L in advance, but is mounted to the case 205 from the outside after the right case 205R and the left case 205L are combined. In this way, the parts in the case 205 are accommodated or mounted in one case (left case 205L) in advance, so that it is possible to efficiently perform assembly operation.

Although the embodiment according to the present invention has been described with reference to the drawings, the specific configuration is not limited to the embodiment, but the present invention may include design variations within the scope without departing the gist of the present invention.

For example, although an exemplary configuration has been explained where the driving part is an engine, the present invention is not limited to this, and a driving means such as an electric motor is possible.

In addition, although an exemplary configuration has been explained where the main handle has a ring shape as seen in side view, the present invention is not limited to this. The main handle may be shaped as a cylindrical rod as long as it includes a gripper that the user holds and is provided to be able to rotate with respect to the main body.

Moreover, although an exemplary configuration has been explained where five restriction grooves for the restriction part (locking portion) are provided every forty-five degrees, the present invention is not limited to this. Another configuration is possible where seven restriction grooves are provided every thirty degrees and three restriction grooves are provided every ninety degrees, and various modifications may be made appropriately depending on the feature of a power working machine to which the present invention is applied.

The invention claimed is:

1. A handheld power working machine comprising:
a main body including a driving part;
a working part configured to drive by the driving part; and
a gripper,
the gripper including:
a restriction part configured to be able to switch between at least a restriction state where the gripper is restricted from rotating with respect to the main body and a release state where the gripper can rotate by releasing the restriction state; and
a plurality of switching operation parts, wherein:
the gripper is provided to be able to rotate, with respect to the main body, around a rotational axis extending from a front side, where the working part is located, to a rear side where the gripper is located,
the plurality of switching operation parts are each configured to perform a switching operation to switch between the restriction state and the release state in the restriction part,
the plurality of switching operation parts are disposed on at least a right side and a left side as viewed toward the front side of the gripper,
the switching operation parts include respective force point portions that are configured to be pressed while holding the gripper,
the switching operation parts are provided to be able to slide in a downward direction of the handheld power working machine with respect to the gripper, and
a direction in which the switching operation parts slide and a direction in which a force acts on the force point portions are parallel to one another.

2. The handheld power working machine according to claim 1, wherein:
the switching operation parts are biased by a biasing member; and
the respective switching operation parts disposed on at least the right side and the left side of the gripper are substantially a same distance apart from the biasing member.

3. The handheld power working machine according to claim 2, wherein:
the gripper is formed by a casing which is fabricated by combining a pair of case components having opening parts opposite to one another;
a plurality of parts are accommodated in the casing; and one case component is combined into the other case component after the plurality of parts are accommodated in the one case component.

4. The handheld power working machine according to claim 3, wherein:
the gripper includes a throttle lever to operate output of the driving part; and
the switching operation parts are disposed in positions in the gripper where the switching operation parts and also the throttle lever can be operated while the gripper is held.

5. The handheld power working machine according to claim 2, wherein:
the gripper includes a throttle lever to operate output of the driving part; and
the switching operation parts are disposed in positions in the gripper where the switching operation parts and also the throttle lever can be operated while the gripper is held.

6. The handheld power working machine according to claim 1, wherein:
the gripper is formed by a casing which is fabricated by combining a pair of case components having opening parts opposite to one another;
a plurality of parts are accommodated in the casing; and
one case component is combined into the other case component after the plurality of parts are accommodated in the one case component.

7. The handheld power working machine according to claim 6, wherein:
the gripper includes a throttle lever to operate output of the driving part; and
the switching operation parts are disposed in positions in the gripper where the switching operation parts and also the throttle lever can be operated while the gripper is held.

8. The handheld power working machine according to claim 1, wherein:
the gripper includes a throttle lever to operate output of the driving part; and
the switching operation parts are disposed in positions in the gripper where the switching operation parts and also the throttle lever can be operated while the gripper is held.

* * * * *